(12) United States Patent
Baughman et al.

(10) Patent No.: US 11,606,221 B1
(45) Date of Patent: Mar. 14, 2023

(54) EVENT EXPERIENCE REPRESENTATION USING TENSILE SPHERES

(71) Applicant: INTERNATIONAL BUSINESS MACHINES CORPORATION, Armonk, NY (US)

(72) Inventors: Aaron K. Baughman, Cary, NC (US); Mauro Marzorati, Lutz, FL (US); Sarbajit K. Rakshit, Kolkata (IN); Shikhar Kwatra, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/549,180

(22) Filed: Dec. 13, 2021

(51) Int. Cl.
*G06F 15/16* (2006.01)
*H04L 12/18* (2006.01)
*G06F 3/04845* (2022.01)

(52) U.S. Cl.
CPC ...... *H04L 12/1822* (2013.01); *G06F 3/04845* (2013.01); *H04L 12/1831* (2013.01)

(58) Field of Classification Search
None
See application file for complete search history.

(56) References Cited

U.S. PATENT DOCUMENTS

| | | | |
|---|---|---|---|
| 6,124,862 | A | 9/2000 | Boyken et al. |
| 8,813,125 | B2 | 8/2014 | Reisman |
| 8,963,916 | B2 | 2/2015 | Reitan |
| 2011/0055730 | A1* | 3/2011 | Caswell ............ G06Q 30/02 715/753 |
| 2012/0133638 | A1 | 5/2012 | Davison et al. |
| 2012/0272208 | A1 | 10/2012 | Pryhuber |
| 2013/0083173 | A1 | 4/2013 | Geisner et al. |
| 2013/0232435 | A1* | 9/2013 | Knapp ............... G06Q 50/01 715/771 |
| 2013/0314508 | A1 | 11/2013 | Arima |
| 2013/0339374 | A1* | 12/2013 | Skeen ............... G06F 16/686 707/754 |
| 2015/0120406 | A1 | 4/2015 | Ekberg |
| 2015/0248917 | A1 | 9/2015 | Chang et al. |

(Continued)

FOREIGN PATENT DOCUMENTS

JP 2019536131 12/2019
WO WO-2021212089 A1 * 10/2021 ....... H04N 21/21805

OTHER PUBLICATIONS

Mell et al., "The NIST Definition of Cloud Computing", NIST, Special Publication 800-145, Sep. 2011, 7 pages.

(Continued)

*Primary Examiner* — Phyllis A Book
(74) *Attorney, Agent, or Firm* — Michael O'Keefe; Andrew D. Wright; Calderon Safran & Cole, P.C.

(57) ABSTRACT

A computer-implemented method includes: presenting, by a computing device, a virtual event user interface to an attendee of a virtual event; obtaining, by the computing device, data about actions performed by the attendee within the virtual event; creating, by the computing device, a tensile sphere kernel that is specific to the attendee using the obtained data; determining, by the computing device, an event recommendation of the virtual event using the tensile sphere kernel; and presenting, by the computing device, the event recommendation to the attendee by changing the virtual event user interface to show the event recommendation.

20 Claims, 9 Drawing Sheets

(56) References Cited

U.S. PATENT DOCUMENTS

| | | | | |
|---|---|---|---|---|
| 2016/0086104 | A1* | 3/2016 | Wouhaybi | G06Q 50/01 |
| | | | | 705/5 |
| 2016/0147383 | A1 | 5/2016 | Kneece | |
| 2017/0048592 | A1 | 2/2017 | Branch et al. | |
| 2018/0203587 | A1 | 7/2018 | Gottlieb | |
| 2018/0285406 | A1* | 10/2018 | Shah | G06Q 10/063116 |
| 2018/0350144 | A1* | 12/2018 | Rathod | H04W 4/021 |
| 2019/0332994 | A1* | 10/2019 | Adamson | G06Q 30/0283 |
| 2021/0224765 | A1* | 7/2021 | Siddique | G06Q 10/10 |
| 2021/0342720 | A1* | 11/2021 | Terra | G06N 5/04 |
| 2021/0398029 | A1* | 12/2021 | Royall, Jr. | G06Q 10/02 |
| 2022/0245158 | A1* | 8/2022 | Kehal | G06F 16/24573 |

OTHER PUBLICATIONS

Hong et al, "Global-Scale Event Dissemination on Mobile Social Channeling Platform", https://ieeexplore.ieee.org/document/6834964, Apr. 8-11, 2014, 3 pages.

Ryskeldiev et al., "ReactSpace: Spatial-Aware User Interactions for Collocated Social Live Streaming Experiences", https://ieeexplore.ieee.org/document/8616128, Oct. 7-10, 2018, 3 pages.

Santano et al., "Aerial virtual reality 360 research-creation", https://ieeexplore.ieee.org/document/8346262, Oct. 31-Nov. 4, 2017, 3 pages.

De Castro Alves et al., "A general extension system for event processing languages", https://dl.acm.org/doi/10.1145/2002259.2002261, Jul. 11, 2011, 4 pages.

Sykownik et al., "The Experience of Social Touch in Multi-User Virtual Reality", https://dl.acm.orgdoi/10.1145/3385956.3418944, Nov. 1, 2020, 11 pages.

Zhu et al., "Warping of a spherical representation of image-based models on GPU", https://dl.acm.org/doi/10.1145/1670252.1670272, Dec. 14, 2009, 4 pages.

Anonymous, "Virtual Venue", https://hopin.com/products/virtual-venue, accessed Dec. 10, 2021, 5 pages.

Anonymous, "Definitive Guide to Virtual and Hybrid Events", IBM White Paper, 2020, 15 pages.

List of IBM Patents or Patent Applications Treated as Related, dated Dec. 13, 2021, 1 page.

Specification "Event Experience Representation Using Tensile Sphere Mixing and Merging" and Drawings in U.S. Appl. No. 17/548,814, filed Dec. 13, 2021, 48 pages.

\* cited by examiner

EVENT EXPERIENCE REPRESENTATION USING TENSILE SPHERES

BACKGROUND

Aspects of the present invention relate generally to virtual events and, more particularly, to personalizing a user experience at virtual events using tensile spheres.

A virtual event is a technology-driven event where content and interactive activities are delivered to an online audience. It can be an alternative to hosting an in-person event. A hybrid event is an event that combines a virtual and an in-person audience in one or more locations and may require attendees to specify virtual or in-person during the registration process.

A virtual event may be more convenient for both event organizers and attendees compared to a live (in-person) event. For example, a virtual event can save a tremendous amount of time and financial overhead. There are no physical venues to secure, no catering, no security staffing, and, of course, no travel required to get there. Virtual events dramatically reduce overhead since you won't be incurring costs on venue, heating, air conditioning, catering, Wi-Fi, staffing, security, rentals, accommodation, travel, etc. In terms of convenience for attendees, a virtual event can be attended from anywhere in the world with a network connection, without need to travel to a physical venue.

SUMMARY

In a first aspect of the invention, there is a computer-implemented method including: presenting, by a computing device, a virtual event user interface to an attendee of a virtual event; obtaining, by the computing device, data about actions performed by the attendee within the virtual event; creating, by the computing device, a tensile sphere kernel that is specific to the attendee using the obtained data; determining, by the computing device, an event recommendation of the virtual event using the tensile sphere kernel; and presenting, by the computing device, the event recommendation to the attendee by changing the virtual event user interface to show the event recommendation.

In another aspect of the invention, there is a computer program product including one or more computer readable storage media having program instructions collectively stored on the one or more computer readable storage media. The program instructions are executable to: present a virtual event user interface to an attendee of a virtual event; obtain data about actions performed by the attendee within the virtual event; create a tensile sphere kernel that is specific to the attendee using the obtained data; determine an event recommendation of the virtual event using the tensile sphere kernel; and present the event recommendation to the attendee by changing the virtual event user interface to show the event recommendation.

In another aspect of the invention, there is system including a processor, a computer readable memory, one or more computer readable storage media, and program instructions collectively stored on the one or more computer readable storage media. The program instructions are executable to: present a virtual event user interface to an attendee of a virtual event; obtain data about actions performed by the attendee within the virtual event; create a tensile sphere kernel that is specific to the attendee using the obtained data; determine an event recommendation of the virtual event using the tensile sphere kernel; and present the event recommendation to the attendee by changing the virtual event user interface to show the event recommendation.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
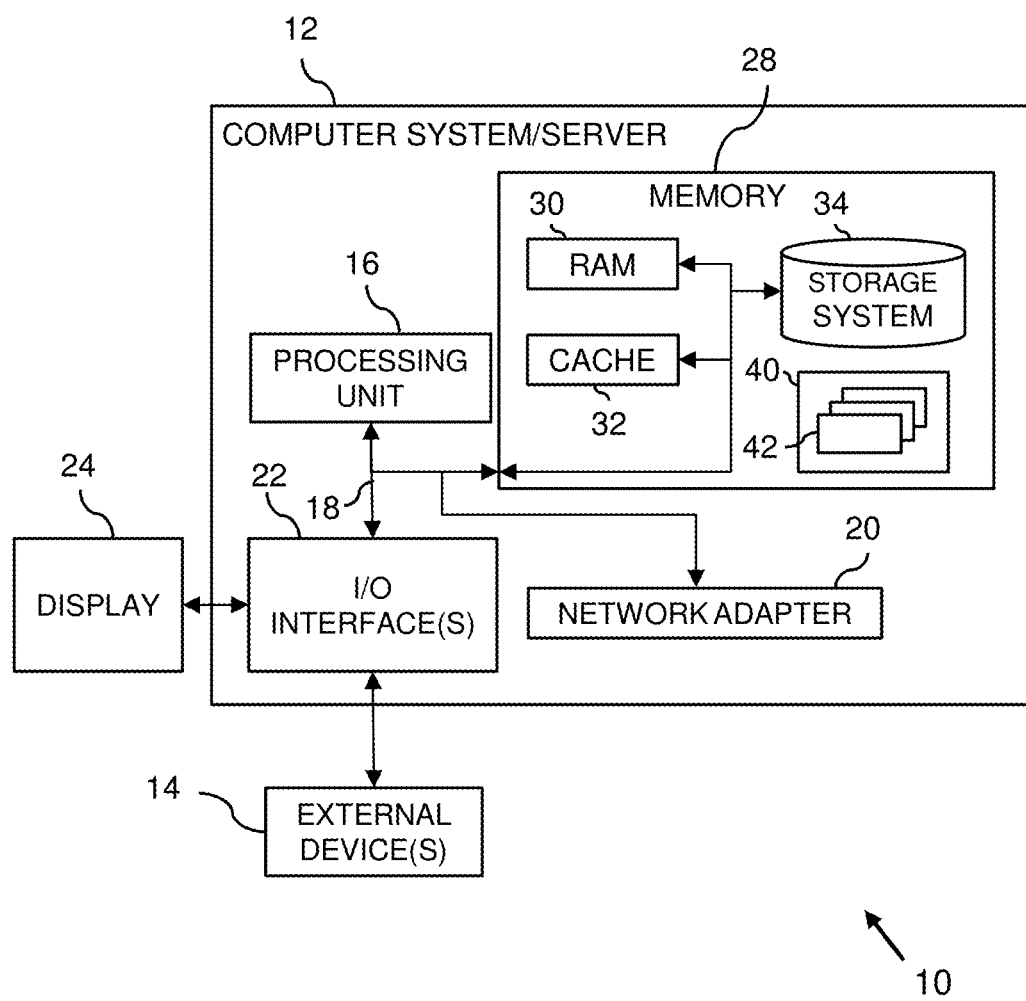
FIG. 1 depicts a cloud computing node according to an embodiment of the present invention.

Aspects of the present invention relate generally to virtual events and, more particularly, to personalizing a user experience at virtual events using tensile spheres. Implementations of the invention leverage the space between physical and virtual spaces to define a continuum of engagement by embracing adaptation, personalization, and laws of artificial intelligence (AI). Using this construct, implementations have the potential to revolutionize the virtual event industry by achieving an exceptional and morphing virtual experience based on the laws of AI, personalization, and adaptation. By using systems of methods according to aspects of the invention, users will be able to experience a unique and signature virtual event that molds around them based on a tensile sphere.

Embodiments of the invention encode virtual events into personalized, gamified, and multimedia experiences called the tensile sphere. The tensile sphere may be built on top of IBM Watson Media and may be programmed to learn and adapt from user profiles and behaviors to deliver engaging content within an event construct. (IBM and IBM WATSON are trademarks owned by International Business Machines Corporation in the Unites Stated and other countries.) In implementations, aspects of a virtual event are represented in a tensile sphere along three axes as follows: data and insights are attracted to each user's unique information affinity that is personalized (z-axis) to a user; the general event adapts (y-axis) over time to align crowd interests with business objectives; and broad laws of AI (x-axis) establish the enabled feature sets such as gamification and social interaction for an immersive environment. The placement of a specific user onto the tensile sphere (x,y,z) creates a timeless and world class experience within a virtual event.

Aspects of the invention provide for the encoding of a virtual event into a tensile sphere using three axes where each point in the sphere is a unique experience. Embodiments utilize a combination of machine learning, event participant, and governing body mathematical creation of an experience. Embodiments identify an affinity between a multitude of tensile spheres based on correlating interests, availability, and events. Embodiments provide for geofencing based on a plurality of tensile spheres merging with each other based on affinity learning. Embodiments also provide social tensor replaying with tensor time.

Implementations of the invention improve the technological area of virtual events by providing an enhanced user experience during and after such events through the use of the tensile sphere and tensile sphere kernel. Implementations of the invention also change the physical state of a user device by causing changes to the user interface that is displayed during a virtual event.

It should be understood that, to the extent implementations of the invention collect, store, or employ personal information provided by, or obtained from, individuals (for example, user data obtained and interactions recorded during virtual events), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium or media, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
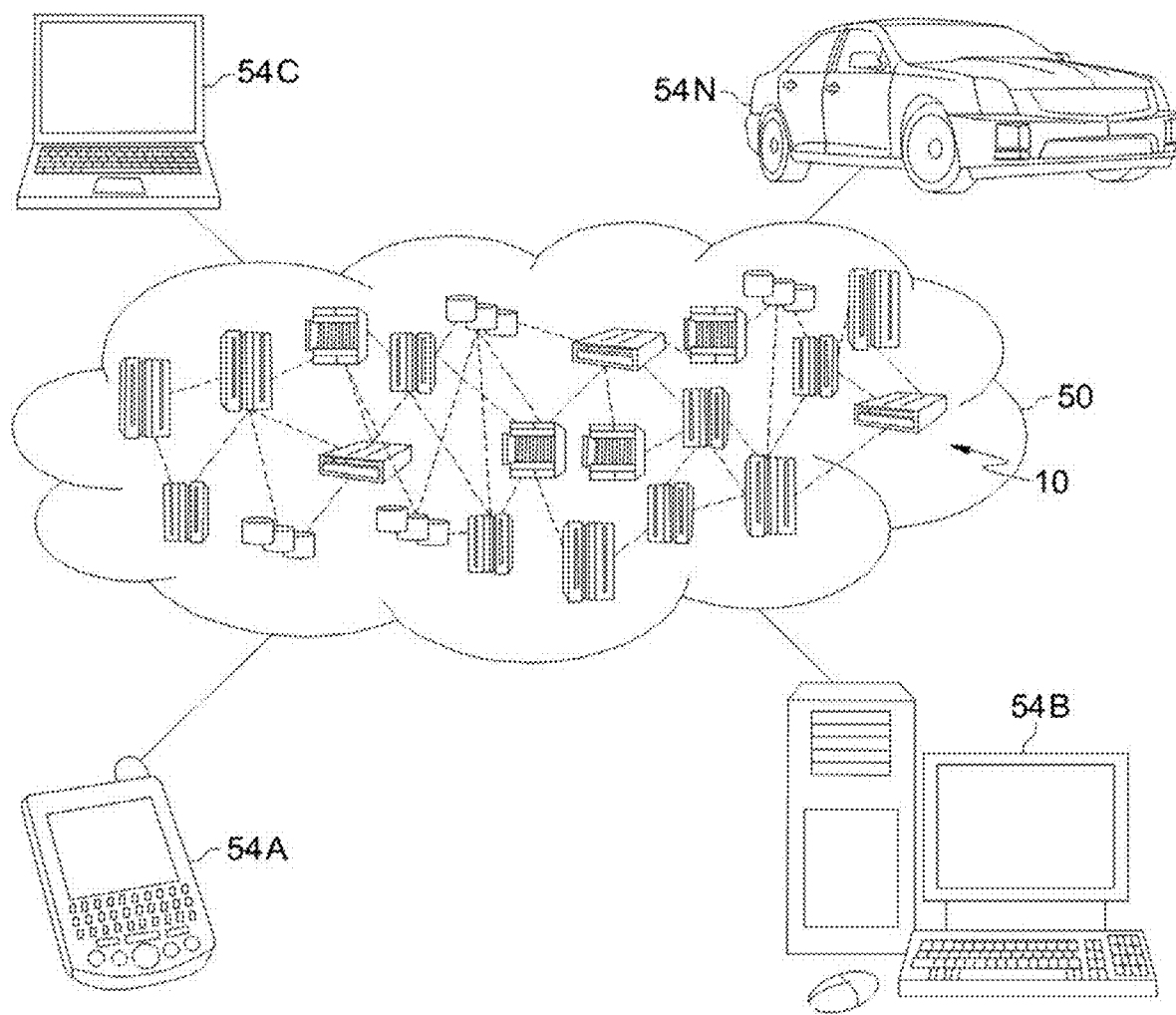
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
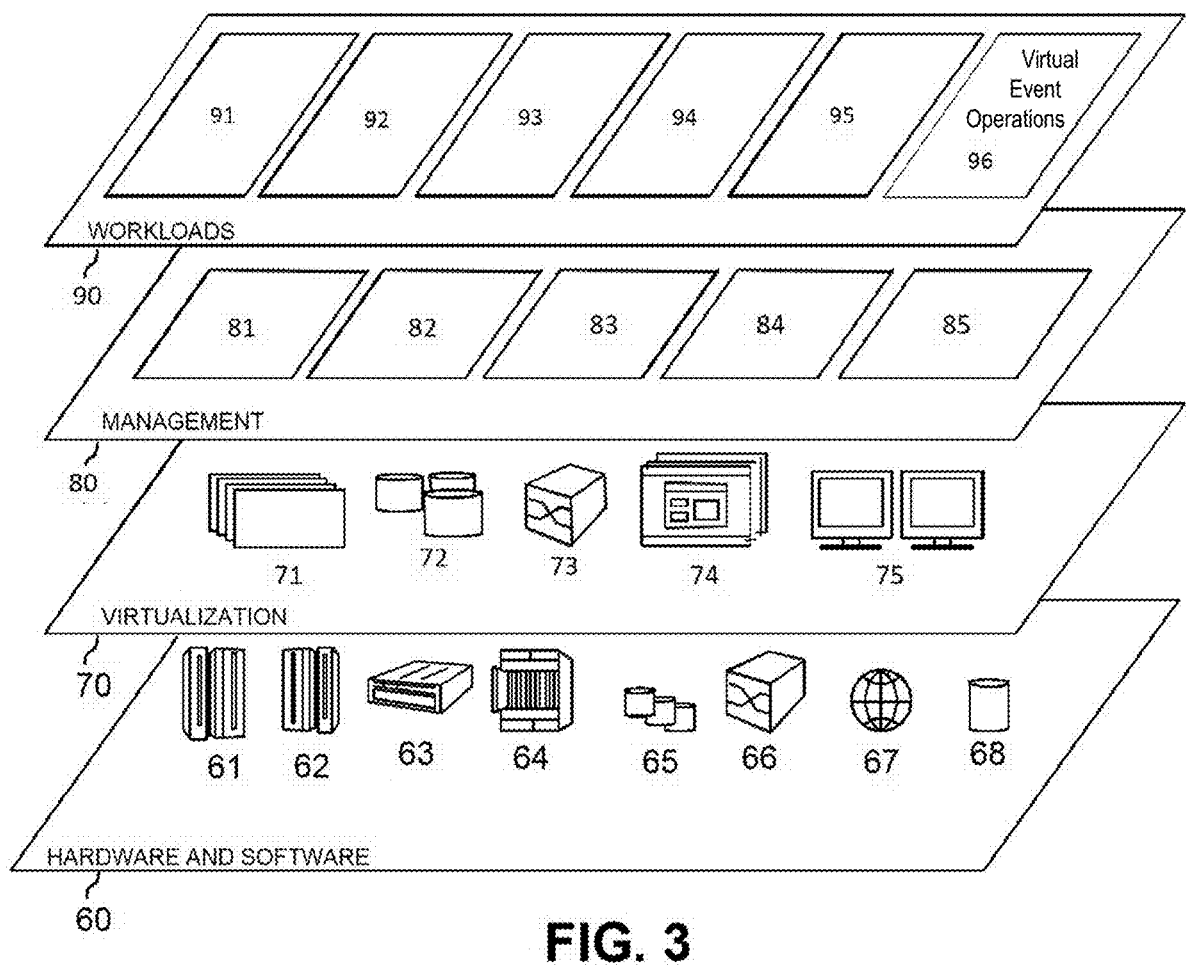
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and virtual event operations 96.

Implementations of the invention may include a computer system/server 12 of FIG. 1 in which one or more of the program modules 42 are configured to perform (or cause the computer system/server 12 to perform) one of more functions of the virtual event operations 96 of FIG. 3. For example, the one or more of the program modules 42 may be configured to: present a virtual event user interface to an attendee of a virtual event; obtain data about actions performed by the attendee within the virtual event; create a tensile sphere kernel that is specific to the attendee using the obtained data; determine an event recommendation of the virtual event using the tensile sphere kernel; and present the event recommendation to the attendee by changing the virtual event user interface to show the event recommendation.

Figure 4:
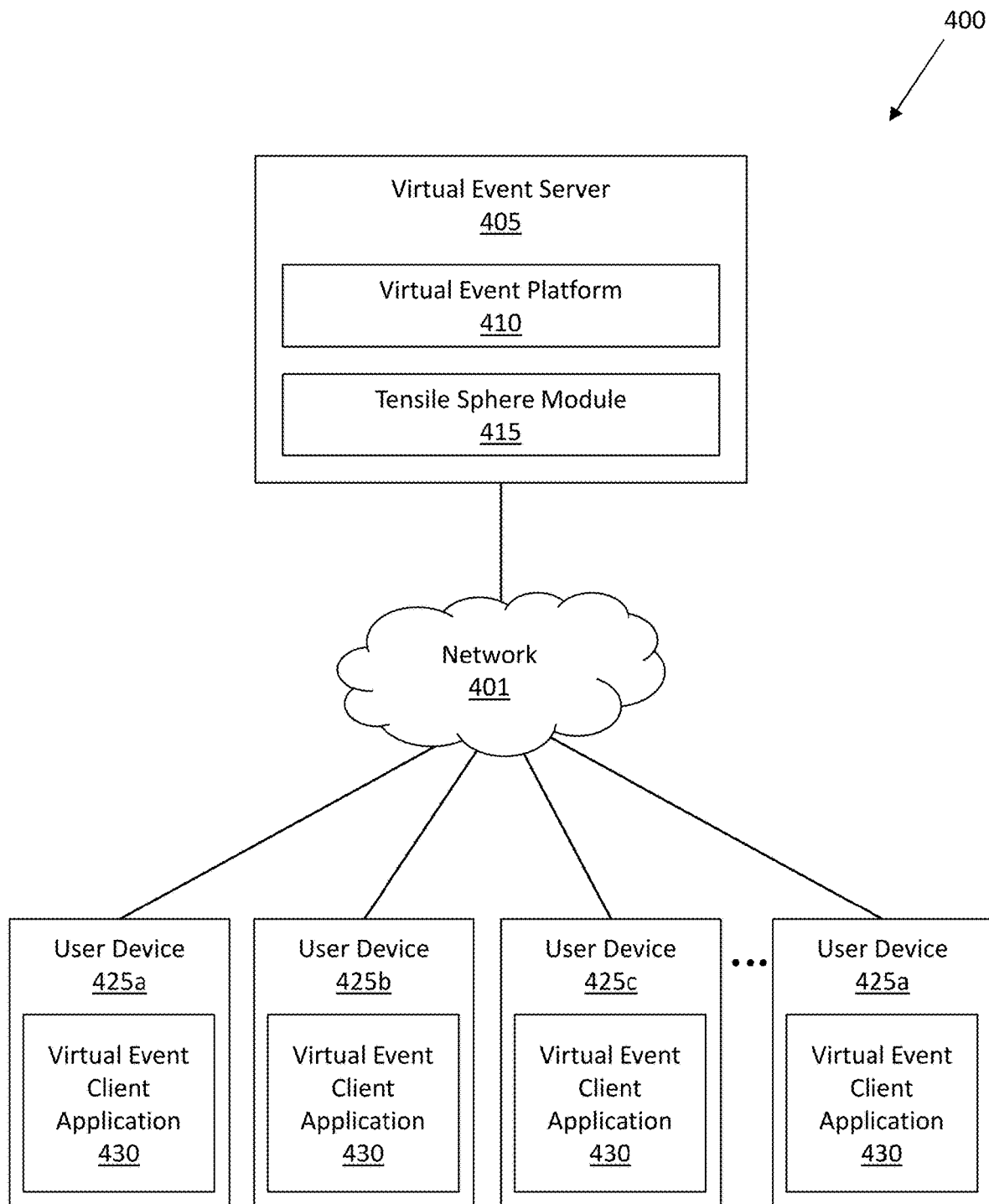
FIG. 4 shows a block diagram of an exemplary environment in accordance with aspects of the invention.

FIG. 4 shows a block diagram of an exemplary environment 400 in accordance with aspects of the invention. In embodiments, the environment 400 includes a network 401 providing communication between a virtual event server 405 and plural user devices 425a, 425b, 425c, . . . , 425n. The network 401 may comprise any one or more communication networks such as a LAN, WAN, and the Internet, and combinations thereof. In a cloud implementation, the network 401 comprises or is part of the cloud environment 50 of FIG. 2, the virtual event server 405 comprises one or more cloud computing nodes 10 of FIG. 2, and each of the user devices 425a-n comprises one of the local computing devices 54A-N of FIG. 2.

The virtual event server 405 runs a virtual event platform 410 that hosts the virtual event and provides data to the user devices 425a-n. In one example, the virtual event server 405 is one or more computing devices each including one or more elements of the computer system/server 12 of FIG. 1. In another example, the virtual event server 405 is one or more virtual machines (VMs) or containers running on one or more computing devices. The virtual event platform 410 can comprise one or more programs (e.g., program/utility 40 of FIG. 1) running on the virtual event server 405 in a coordinated manner that provides content of the virtual event to the user devices 425a-n. In embodiments, the virtual event server 405 comprises a tensile sphere module 415, which may comprise one or more program modules such as program modules 42 described with respect to FIG. 1. The virtual event server 405 may include additional or fewer programs/modules than those shown in FIG. 4. In embodiments, separate programs/modules may be integrated into a single program/module. Additionally, or alternatively, a single program/module may be implemented as multiple programs/modules. Moreover, the quantity of devices and/or networks in the environment is not limited to what is shown in FIG. 4. In practice, the environment may include additional devices and/or networks; fewer devices and/or networks; different devices and/or networks; or differently arranged devices and/or networks than illustrated in FIG. 4.

There may be any number "n" of user devices 425a-n. Each user device 425a-n comprises a computing device such as a smartphone, desktop computer, laptop computer, tablet computer, etc., and may comprise one or more elements of the computer system/server 12 of FIG. 1. In embodiments, each user device 425a-n comprises a virtual event client application 430 that communicates with the virtual event platform 410 to provide virtual event functionality to the users of the user devices 425a-n. In one example, the virtual event client application 430 comprises a program (e.g., program/utility 40 of FIG. 1) that is specifically related to the virtual event platform 410, e.g., as part of a same virtual event software product. In another example, the virtual event client application 430 is a browser application that provides web-based access to the virtual event platform 410. In embodiments, and in both examples, the virtual event client application 430 and the virtual event platform 410 communicate with each other to provide a user with virtual event functions including but not limited to: generating and displaying an event user interface (event UI) on the user device 425a-n; permitting a user to register with the virtual event; presenting virtual event content via the event UI; receiving user input (e.g., voice, video, chat, navigation, etc.) via the event UI.

The virtual event content can include, for example and without limitation: live sessions in which event attendees (e.g., users of user devices 425a-n) watch and/or listen to a presenter in real time; pre-recorded sessions from presenters; video ads from sponsors; video clips from exhibitors; Q&A content for live polling; prepared answers for Q&A sessions; discussion topics for "birds of a feather" breakout rooms; content for additional engagement (gamification, trivia, etc.); music for breaks/intermissions or background for chat breakout rooms; slide decks or other leave-behind content; branded physical or digital backdrops for speakers; virtual booths for one-on-one video chat meetings between presenters/exhibiters and attendees; and virtual reality spaces. As but one example, the virtual event platform 410 might offer a true virtual reality experience that somewhat feels like you are entering a physical booth space. In another example, the virtual event platform 410 may provide multiple channels within an event in which individual channels can be designated as booths and then channel navigation can be setup so that attendees choose which booth they want to "visit" during designated times. In this example, a vendor/exhibiter can offer pre-scheduled meeting times and/or have open booth hours that allow attendees to flow from booth to booth freely. In another example, content can include multiple channels of engagement such as interactivity/feedback tools (e.g., live chat rooms, Q&A modules, and polling features), communication (breakout rooms features or networking features that allow attendees to connect with each other in one-on one private conversations or smaller groups during the event), and gamification features (e.g., that encourage specific behavior during the event).

In embodiments, the virtual event platform 410 is configured to obtain analytics about user interactions with the virtual event, including pre-event analytics, real-time analytics, and post-event analytics. Pre-event analytics can include, for example and without limitation, tracking overall event registration, session registration, and ticket sales before the virtual event begins. Real-event analytics can include, for example and without limitation, real-time attendance for the overall event during the event, real-time attendance for specific areas of the event during the event, and content viewed by attendees during the event. Real-time analytics while the event is still going on can help event organizers understand engagement in the moment as well as provide the ability to spot troubles if a portion of the audience suddenly has technical difficulties. Post-event analytics can include, for example and without limitation, attendee interaction data, booth interaction, and attendee engagement reports. Such event analytics provide insight on which sessions an individual event attendee spent the most time watching, how many questions were posted, how many comments input, breakouts discussions attended, etc. Event analytics can provide insight into how many people attended a session or booth, how many people watched each live stream or on-demand session, etc. Event analytics can be used to track every click and engagement, such as in chat rooms or breakouts, and gather data from online polls. The virtual event platform 410 may obtain these analytics (and others) using conventional or later-developed techniques.

In embodiments, the tensile sphere module 415 is configured to analyze the analytics obtained by the virtual event platform 410, determine event recommendations for users based on this analysis, and cause the virtual event platform 410 to present the event recommendations to users via the event UI on the user devices 425*a-n*. The event recommendations can include but are not limited to: suggestions to consume content available in the virtual event; suggestions to use features available in the virtual event; and suggestions to interact with other users in the virtual event. The tensile sphere module 415 can be one or more program modules (e.g., program modules 42 of FIG. 1) that are part of the virtual event platform 410.

Figure 5:
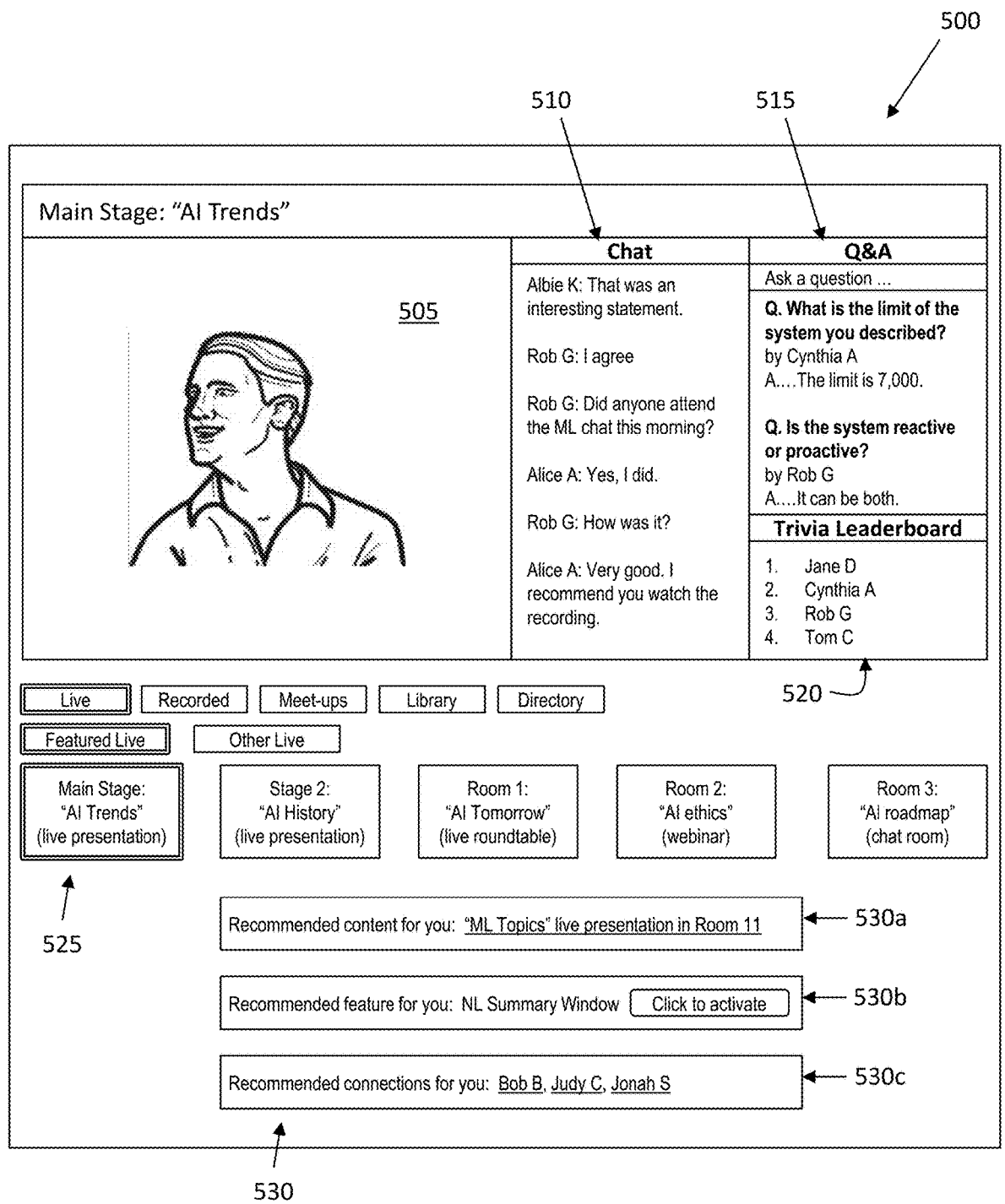
FIG. 5 shows an example of an event user interface of a virtual event in accordance with aspects of the invention.

FIG. 5 shows an example of an event UI 500 of a virtual event in accordance with aspects of the invention. The UI 500 may include, for example and without limitation: a first area 505 that plays a current selection (e.g., the "Main Stage: AI Trends" live presentation in this example); a chat area 510; a Q&A area 515; a gamification area 520; and a navigation area 525. Some virtual events may include as many as 10,000 attendees and have upwards of 100 different speakers presenting live content at any given time. Virtual events may also have hundreds of pre-recorded videos and hundreds or even thousands of documents available to view in a library. Even for events that last multiple days, it is impossible (due to the amount of available content versus the amount of available time) for a single user to consume, in real time during the event, all the content that is available at such an event. For the same reason, it can be impossible for a single user to meet and intact with all the other attendees at an event. As a result, a user might miss out on content that would be of interest to them and/or might miss out on meeting another attendee that would be of interest to them.

To address this issue, embodiments of the invention monitor a user's actions within a virtual event, generate a personalized tensile sphere kernel based on the monitored actions, and provide recommendations to the user based on the personalized tensile sphere kernel. The recommendations are for things within the virtual event that the system determines might be of interest to the user and can include, for example: a recommendation to consume particular content of the virtual event; a recommendation to utilize a particular feature of the virtual event; a recommendation to connect with a particular attendee of the virtual event; and a recommendation to navigate along a particular path in the virtual event. As shown in FIG. 5, in embodiments the UI 500 includes a recommendation area 530 that includes one or more event recommendations represented by a content recommendation 530*a*, a feature recommendation 530*b*, and a connection recommendation 530*c*. The style and visual format of the UI 500, including the style and visual format of the recommendations 530*a-c*, is exemplary, and other styles and/or visual formats may be used in implementations.

In embodiments, the content recommendation 530*a* includes a recommendation for a particular content that is available in the virtual event that this user has not yet consumed (e.g., viewed or otherwise interacted with). The content might be, for example and without limitation, a live session, a prerecorded video, or a document. In embodiments, the content recommendation 530*a* a selectable (e.g., 'clickable') field that the user can select in the UI 500 to be taken immediately to that recommended content. In the example of FIG. 5, the user is currently watching a live presentation tilted "Main Stage: AI Trends" in the first area 505. In this example, the act of selecting the selectable field in the content recommendation 530*a* changes the first area to start showing the recommended content associated with the selectable field, e.g., "ML Topics" in this example. In this example, the system leverages virtual event analytics of this user to make a real-time recommendation of content to the user, which the user can select for immediate viewing. In this manner, the system provides the user with the benefit of becoming aware of content that they did not know about and that they might be interested in.

In embodiments, the feature recommendation 530*b* includes a recommendation for a particular feature that is available in the virtual event that this user has not currently using. The feature might be, for example and without limitation: a gamification feature; a debate feature; a natural language summarization feature; a multimedia highlight feature; and a ranking feature. In embodiments, the feature recommendation 530*b* includes a selectable (e.g., 'clickable') field that the user can select in the UI 500 to be taken activate the recommended feature. In the example of FIG. 5, the feature recommendation 530*b* includes a recommendation to activate the feature named "NL Summary Window." In this example, selecting the selectable field in the feature recommendation 530*b* causes the UI 500 to generate a new area (e.g., a window) that shows a text summary of what is being discussed in the first area 505, the summary being generated by the system using natural language processing in real time or near-real time based on a text transcript of the words being spoken in the live presentation that is playing in the first area 505. In this example, the system leverages virtual event analytics of this user to make a real-time recommendation of an available feature to the user, which the user can select for immediate activation. In this manner, the system provides the user with the benefit of becoming aware of a feature that they might not be aware of and that they might be interested in using.

In embodiments, the connection recommendation 530c includes a recommendation for the user to connect with one or more other attendees of the virtual event. In embodiments, the connection recommendation 530c includes a selectable (e.g., 'clickable') field that the user can select in the UI 500 to initiate a meeting with the other attendee. The meeting might be by chat or video conference between the user and the other attendee. In the example of FIG. 5, selecting one of the names in the connection recommendation 530c causes the system to send an invitation to this other attendee informing them of the request to make a connection. In this example, the system leverages virtual event analytics of this user to make a real-time recommendation of making a connection with another attendee. In this manner, the system provides the user with the benefit of becoming aware of another attendee that they might be interested in meeting, who they might not have been aware of before receiving the connection recommendation.

The recommendations shown in FIG. 5 are examples, and other types of recommendations may be made in accordance with aspects of the invention. In embodiments, the tensile sphere module 415 of FIG. 4 determines the recommendations using a tensile sphere as described with respect to FIG. 6 and a tensile sphere kernel as described with respect to FIG. 7.

Figure 6:
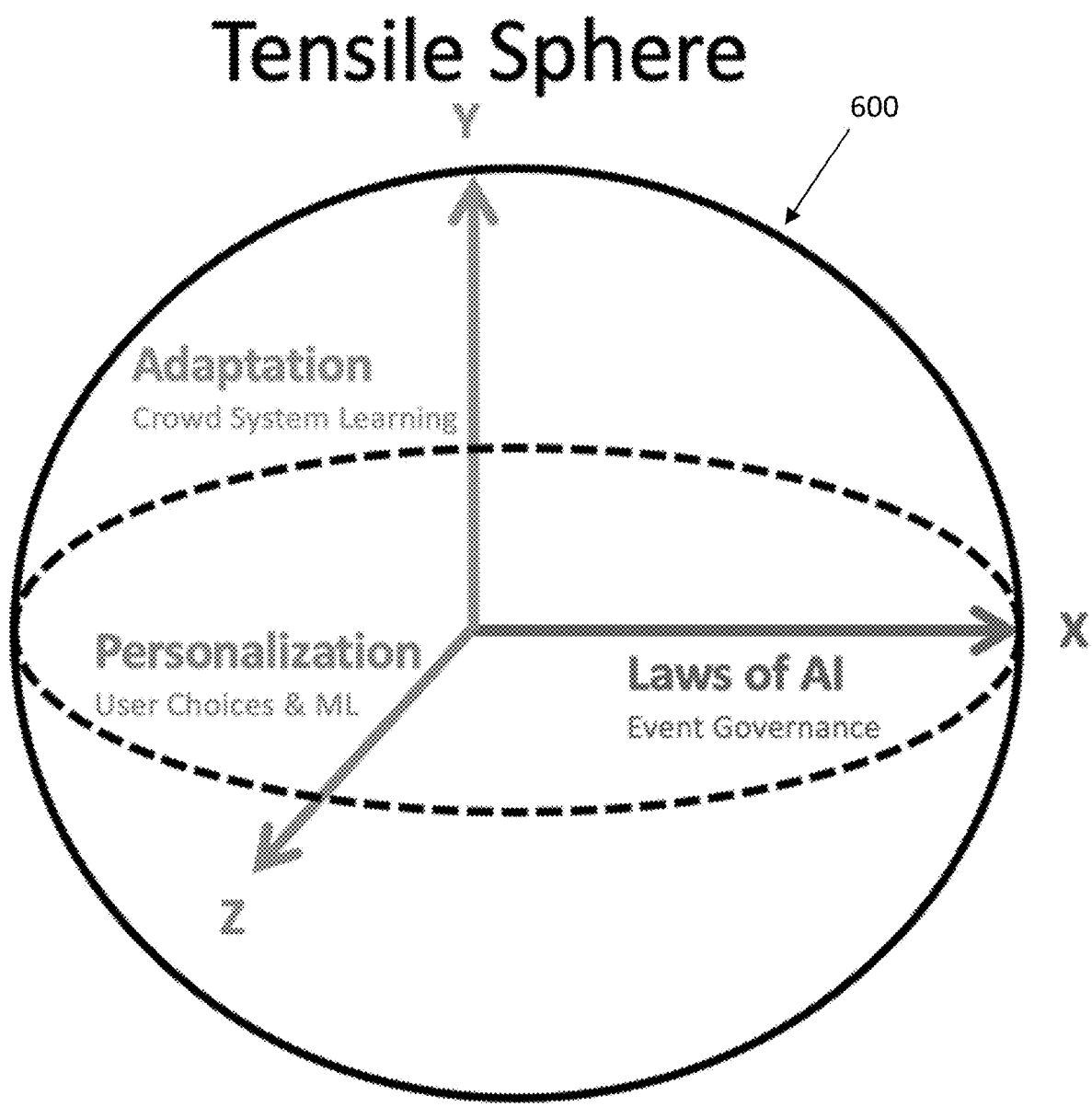
FIG. 6 shows an example of tensile sphere in accordance with aspects of the invention.

FIG. 6 shows an example of tensile sphere 600 in accordance with aspects of the invention. A tensile sphere is a mathematical representation of a particular virtual event. Different virtual events have different tensile spheres. In embodiments, a tensile sphere has three axes (e.g., x,y,z axes) and each aspect of a virtual event can be represented by an x,y,z coordinate within the tensile sphere. In embodiments, and as shown in FIG. 6, the x-axis corresponds to laws of AI (e.g., features that are enabled and supported at a virtual event), the y-axis corresponds to adaption (e.g., how the crowd gravitates towards certain topics and content, and how sessions and people are connected based on crowd behavior and learning), and the z-axis corresponds to personalization (e.g., about the individual user including user customizations and behavior that indicates which content is more important for the specific user). In embodiments, all x, y, and z are combined together to produce a rotation around the sphere to land onto a single point on the sphere.

In embodiments, the laws of AI along the x-axis are combinations of the different features available in the virtual event assigned to numbers between a minimum and a maximum (e.g., −1 and 1) along the x-axis. For example, if there are two available features in the virtual event, then there will be four defined points along the x-axis that correspond to the four possible combinations of these features. For example, neither feature might be at −1, feature 1 only could be at −0.3, feature 2 might be at 0.3, and feature 1 and feature 2 together might be at 1. In implementations, the combinations of features and their respective values along the x-axis are defined by the virtual event coordinator.

In embodiments, the adaptation along the y-axis is a measure between a minimum and a maximum (e.g., −1 and 1) of a user's interactions with other attendees within the virtual event. In a learning example, the system monitors all the user's interactions within other attendees in the virtual event and determines: a measure of how much this user wants to interact with other attendees; and what types of other attendees this user tends to interact with the most and the least.

In embodiments, the personalization along the z-axis is a measure between a minimum and a maximum (e.g., −1 and 1) of a user's likes and dislikes of topics of content within the virtual event. A user's likes and dislikes may be determined based on user input and/or based on learning from user actions within the virtual event. For example, a user may complete a profile prior to or during the virtual event in which they indicate (e.g., using check boxes of predefined topics) which topics they like, which topics they dislike, and which topics they are indifferent toward. In the learning example, the system monitors all the user's actions within the virtual event and determines levels of like and dislike of topics based on the actions. For example, the system may determine that user likes a topic if the user watches a presentation associated with the topic. The system may determine an even higher measure of like for this topic based on detecting that the user engaged in discussion about the topic during or after the presentation. Conversely, the system may determine that a user dislikes a topic of the user started watching a presentation associated with the topic but quickly stopped watching the presentation.

In embodiments, the three-dimensional tensile sphere 600 is represented as two-dimensional equation while using phase shifts as $(x-a)^2+(y-b)^2+(z-c)^2=r^2$. When a, b, and c equal zero (0), this expression reduces to $(x)^2+(y)^2+(z)^2=1$. In this example, if a user selects a personalization value 0.5 and laws of AI value of 0.2, then personalization will be 0.84. In embodiments, the virtual administrator can alter and change the laws of AI contribution while the user can change the personalization magnitude based on the amount of behavior and selections.

Figure 7:
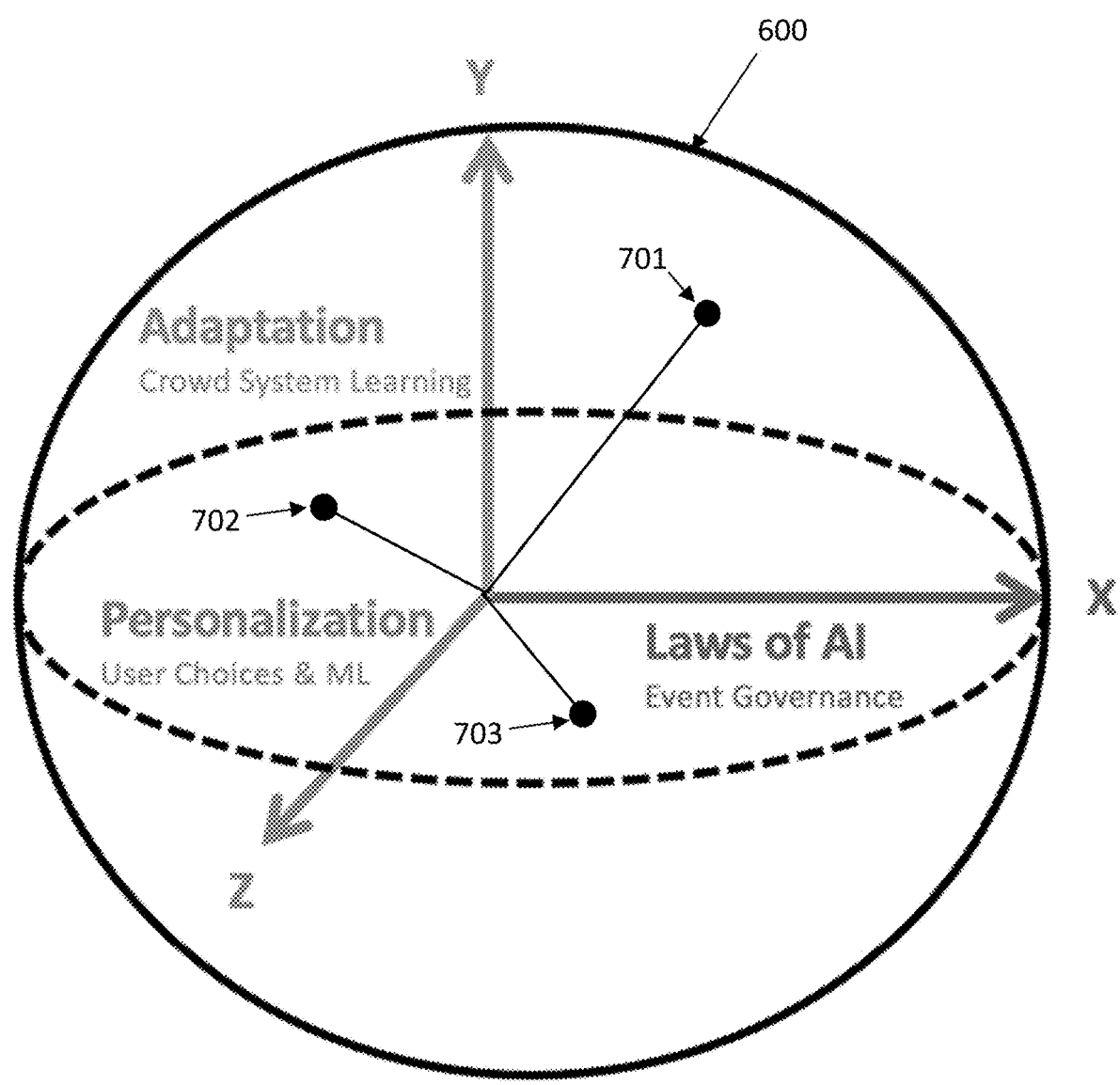
FIG. 7 shows an example of generating a tensile sphere kernel in accordance with aspects of the invention.

FIG. 7 shows an example of generating a tensile sphere kernel in accordance with aspects of the invention. In accordance with aspects of the invention, the tensile sphere module 415 constantly monitors a user's actions in the virtual event (e.g., using real time analytics collected by the virtual event platform), and plots each action as an x,y,z coordinate within the tensile sphere of the event. In the example shown in FIG. 7, at time t1 during the virtual event the user performs a first action that the system plots as point 701 at (x1,y1,z1). In this example, at time t2 during the virtual event the user performs a second action that the system plots as point 702 at (x2,y2,z2). In this example, at time t3 during the virtual event the user performs a third action that the system plots as point 703 at (x3,y3,z3). According to aspects of the invention, the tensile sphere module 415 generates respective data points for a user in real-time as the user is performing respective actions in the event. The volume defined by the collection of all such points for a user is defined as the tensile sphere kernel for this user. In embodiments, a user's tensile sphere kernel changes in real time during the virtual event as the user performs successive actions, with the system revising the tensile sphere kernel by adding a new data point that corresponds to the newest action.

In accordance with aspects of the invention, the tensile sphere module 415 determines an x,y,z coordinate for each user action by utilizing respective AI models for each of the respective axes of the tensile sphere. In embodiments, when the user performs an action in the virtual event, the tensile sphere module 415 obtains event analytics data that defines the action, extracts features from the event analytics data, and generates an x value, a y value, and z value by feeding the extracted features into three respective AI models. In embodiments, the tensile sphere module 415 obtains the event analytics data for each user action from the virtual event platform 410, which obtains the event analytics data for each user in the virtual event using conventional techniques. In embodiments, the user actions that the system monitors and collects analytics on include but are not limited to: consuming content in the virtual event; utilizing features of the virtual event; and interacting with other attendees in the virtual event.

In embodiments, the respective AI models are trained for this particular virtual event using training data. The training may comprise supervised learning used training data sets, wherein each training data set includes a set of features that correspond to this event and an output value between the minimum and a maximum (e.g., −1 and 1) for one of the x-axes, y-axes, and z-axes for the tensile sphere for this virtual event. Models trained in this manner can be used in real time during the event to accept a set of extracted features as input and to output a value between the minimum and a maximum (e.g., −1 and 1) for one of the x-axes, y-axes, and z-axes for the tensile sphere for this virtual event. In this manner, the tensile sphere module 415 generates a tensile sphere kernel for a particular user based on data derived from the user's actions during the event and using AI models that are trained for this virtual event. As noted herein, each attendee of a virtual event will have a different tensile sphere kernel for the virtual event since each attendee will perform a different combination of actions through the event. Also, a single user will have different tensile sphere kernels for different virtual events, since the tensile spheres are different for the different virtual events.

In accordance with aspects of the invention, the tensile sphere module 415 uses a user's tensile sphere kernel to determine an event recommendation for the user. The event recommendation can include, for example and without limitation: a recommendation to consume content of the virtual event; a recommendation to utilize a feature of the virtual event; a recommendation to connect with an attendee of the virtual event; and a recommendation to navigate along a planned path in the virtual event. In embodiments, the tensile sphere module 415 includes an interpretation layer that is programmed to map aspects of the virtual event (e.g., content, other attendees, and features) to x,y,z coordinates of the tensile sphere. In one example, the interpretation layer determines aspects of the virtual event that are within the user's tensile sphere kernel, and selects one or more of these aspects of the virtual event as the event recommendation for the user. In particular, the interpretation layer may determine x,y,z coordinates of all aspects of the virtual event, and compare these x,y,z coordinates to the x,y,z coordinates of the volume defined by the user's tensile sphere, the result being a determination of which aspects of the virtual event have an x,y,z coordinate inside the user's tensile sphere kernel. In situations where the system determines plural aspects of the virtual event inside the user's tensile sphere kernel, the system ranks the aspects and presents the highest ranked aspect to the user before moving on to next ranked aspects. The tensile sphere module 415 then causes the virtual event platform to recommend one or more of these determined aspects of the virtual event to the user via the event UI 500, e.g., as one of recommendations 530a-c shown in FIG. 5.

Tensile sharing can be used to share centers of tensile spheres with friends and family. If non-homogenous tensor spheres want to be shared where the feature on each dimension is different, a correlation between two tensile spheres will be created. The correlation will be a polynomial regression between the current tensile sphere features and other user behaviors to the new tensile features, e.g., according to Expression 1:

$$y = \beta_0 + \beta_1 x + \beta_2 x^2 + \beta_3 x^2 + \ldots \beta_n x^n + \epsilon \quad (1)$$

In embodiments, if the user has not been within the other environment to draw a correlation, similar user behaviors or the most similar are correlated together. In this way, the domain of one non-homogenous sphere is shifted to match the other such that the centers of the sphere can be computed. Based on ranked affinity of correlated interests, availability and events, the tensile sharing will be extended to cluster multiple people in the vicinity. Hence, the tensile spheres can further assist in ranking and prioritization of users within a geofenced region.

In accordance with further aspects of the invention, the system determines an affinity between two attendees of the virtual event using their respective tensile sphere kernels, and makes an event recommendation based on the determined affinity. In embodiments, the system determines the x,y,z coordinate of every attendee at the virtual event at a particular point in time at the virtual event. The system then determines distances between users based on cartesian difference between the x,y,z coordinates of respective users. For two users whose distance apart is less than a predefined threshold value, the system deems these two users to have an affinity and then makes an event recommendation to one or both users in response to determining this affinity. In one example in which both users are within a VR space of the virtual event, the system determines the location of both users within the VR space and plots a path for one or both users to travel to meet the other user in the VR space. The system can present the path(s) to the user(s) in the event UI, which may be displayed in the VR space in this example. In another example in which both users are physically present at a venue of a hybrid event, the system determines the location of both users within the venue and plots a path for one or both users to travel to meet the other user in the venue. The system can present the path(s) to the user(s) in the event UI. In another example, the system determines content and/or features that one user of the affinity likes, and that the other user of the affinity has not yet consumed or used, and recommends this content and/or features to the other user. In another example, the system determines a live session that one user of the affinity is in, and that the other user of the affinity is not in, and recommends that the other user join this live session. In another example, the system presents a link to one or both users that the users can click to initiate a meeting, such as with element 530c of FIG. 5.

In accordance with further aspects of the invention, the system provides a social tensor replay with tensor time. In embodiments, along with the three axes already discussed (e.g., personalized (z-axis), adaptation (y-axis), laws of AI (x-axis)), the system can also use a fourth axis, which is a time axis. With the time axis, user can move along with the time axis, for example forward and backward through content in the virtual event. For example, a user can select any position along the time axis, and based on the selected position of the time in time axis, personalized (z-axis), adapts (y-axis), laws of AI (x-axis) will be interpolated or extrapolated. In embodiments, the virtual event platform 410 saves recordings of all the interactions that occur in the virtual event (e.g., live presentations, chats, polls, debates, etc.). In embodiments, the tensile sphere module 415 saves each user's tensile sphere kernel and can map (through the interpretation layer described herein) data points in the kernel to the recoded interactions saved by the platform. As a result, for a given user's tensile sphere kernel, the system can replay the recordings of each interaction in that tensile sphere kernel in a time sequence at a time after the event has ended. The user may view their replay in the UI 500, and may control the reply using play, rewind, fast forward, and pause controls. In further embodiments, the user can mark certain actions that they liked, and the system will only include these marked actions in the replay, while omitting from the replay actions that are not marked a liked. Such marking can occur in real time during the event and then be used to filter the replay after the event. In this manner, the system: receives input from the attendee defining a subset of the actions performed by the attendee within the virtual event; generates a replay of virtual event, wherein the replay includes content associated with ones of the actions included in the subset and excludes content associated with ones of the actions not included in the subset; and presents the replay of the virtual event in the virtual event user interface.

Figure 8:
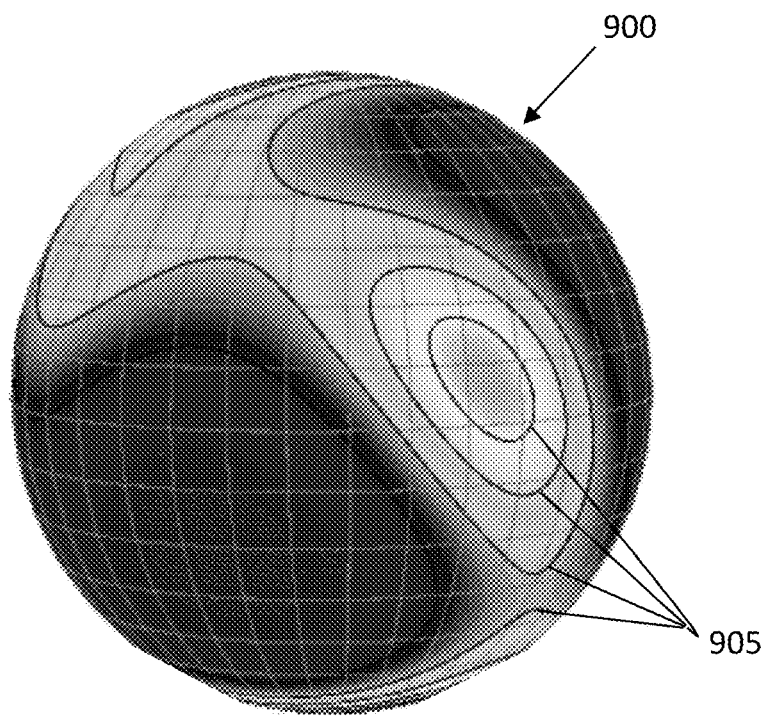
FIG. 8 shows an example of a visual representation of a tensile sphere kernel within a tensile sphere in accordance with aspects of the invention.

FIG. 8 shows an example of a visual representation 900 of a tensile sphere kernel within a tensile sphere in accordance with aspects of the invention. In embodiments, the system creates the visual representation 900 by creating a heat map within the tensile sphere of an event, the heat map being based on the tensile sphere kernel of the user. The visual representation 900 is viewable in the UI 500 and shows different areas having different colors that correspond to areas of like and dislike in the tensile sphere of the event. In embodiments, in response to a user selecting a point in the visual representation 900, the system obtains the content of the virtual event that corresponds to the point and replays the content for the user. In further embodiments, the system receives user input (e.g., via the UI) defining a first point in the visual representation and a second point in the visual representation. In response to this user input, the system determines a path comprising plural intermediate points between the first point and the second point based on minimizing gradient between successive ones of the intermediate points, and presents plural content in succession in the virtual event user interface corresponding to the successive ones of the intermediate points and the second point. In so doing, the system determines a path to guide the user from the content of the first point to the content of the second point, wherein the path includes intermediate waypoints where content is shown, wherein the intermediate waypoints are selected in a manner that minimizes the gradient across the isobars 905 and thus remove the possibility of creating a jarring experience while transitioning along the resulting sphere. This is analogous to spatial navigation humans do to traverse a crowded room (e.g., an exposition floor) that will achieve their desired goal (most/least interactions, avoiding a particular person, etc.). In embodiments, the traversal path is expressed a locus of quadruples: $\{x1, y1, z1\}$; $\{x2, y2, z2\}$; . . . ; $\{xn, yn, zn\}$. As an example, the locus may indicate a path that avoids sticks to places having content the user likes and that avoids places having content the user does not like, thereby avoiding unpleasant conditions as determined by the user's tensile sphere kernel.

Figure 9:
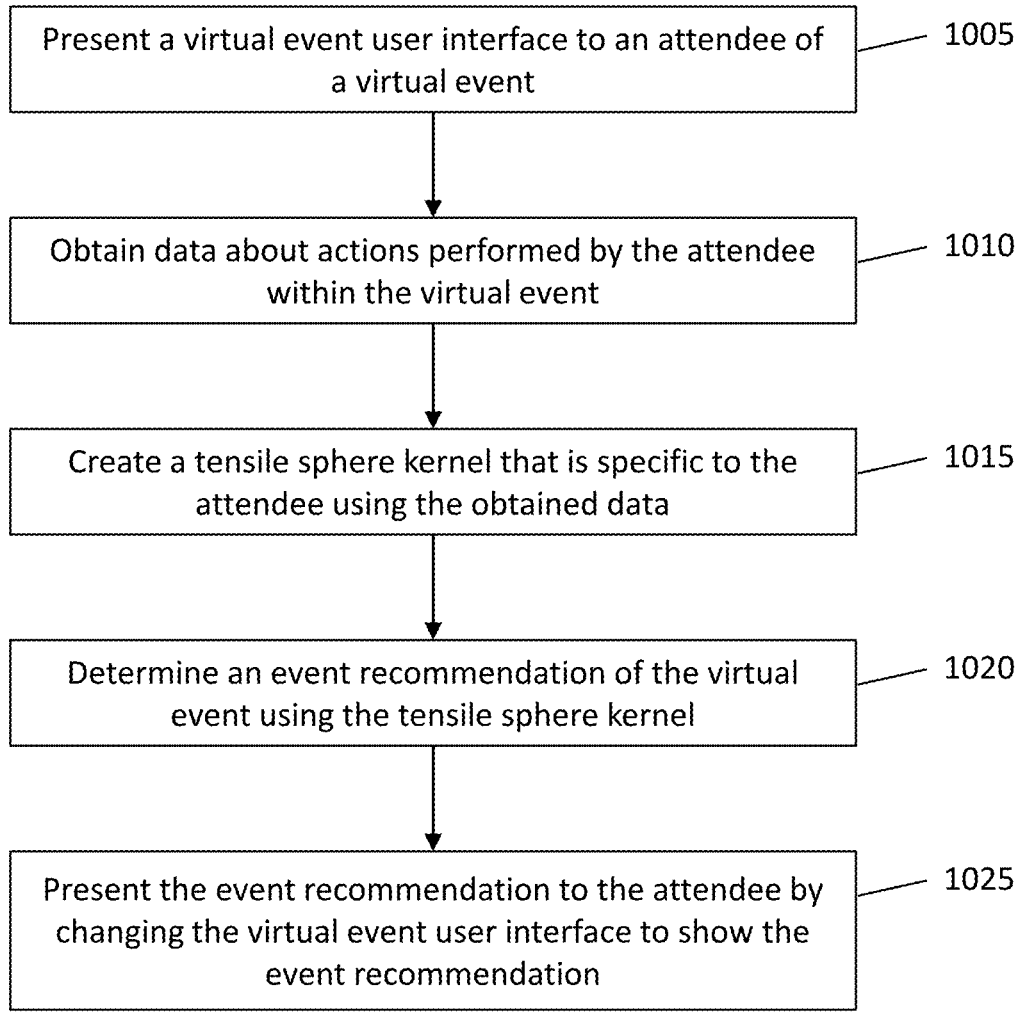
FIG. 9 shows a flowchart of an exemplary method in accordance with aspects of the invention.

FIG. 9 shows a flowchart of an exemplary method in accordance with aspects of the present invention. Steps of the method may be carried out in the environment of FIG. 4 and are described with reference to elements depicted in FIGS. 4-8.

At step 1005, the system presents a virtual event user interface to an attendee of a virtual event. In embodiments, and as described herein, the virtual event platform 410 presents UI 500 to a user of one of the user devices 425*a-n* by communicating with the virtual event client application on the user device.

At step 1010, the system obtain data about actions performed by the attendee within the virtual event. In embodiments, and as described herein, the virtual event platform 410 obtains real time data (e.g., real time event analytics) about every action the user performs in the virtual event, including for example, content watched, documents read, attendees interacted with, text entered, words spoken, votes cast, activities participated in, rooms visited, and features used.

At step 1015, the system creates a tensile sphere kernel that is specific to the attendee using the obtained data. In embodiments, and as described herein, the tensile sphere module 415 creates a tensile sphere kernel for a user by plotting each action as an x,y,z coordinate within the tensile sphere of the event. The plotting may include determining the x,y,z coordinate by extracting features from the data and feeding the extracted features into trained AI models correspond to the different axes of the tensile sphere for the virtual event.

At step 1020, the system determines an event recommendation of the virtual event using the tensile sphere kernel. In embodiments, and as described herein, the tensile sphere module 415 uses an interpretation layer that is programmed to map aspects of the virtual event (e.g., content, other attendees, and features) to x,y,z coordinates of the tensile sphere, and to make an event recommendation based on this mapping. The event recommendation can include, for example and without limitation: a recommendation to consume content of the virtual event; a recommendation to utilize a feature of the virtual event; a recommendation to connect with an attendee of the virtual event; and a recommendation to navigate along a planned path in the virtual event.

At step 1025, the system presents the event recommendation to the attendee by changing the virtual event user interface to show the event recommendation. In embodiments, and as described herein, the virtual event platform 410 presents the recommendation in the UI 500 of the user's user device. Since the user's tensile sphere kernel changes as the virtual event progresses, the system determines and presents new event recommendations on a periodic basis throughout the virtual event.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer system/server 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system/server 12 (as shown in FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
presenting, by a computing device, a virtual event user interface to an attendee of a virtual event;
obtaining, by the computing device, data about actions performed by the attendee within the virtual event;
creating, by the computing device, a tensile sphere kernel that is specific to the attendee using the obtained data;
determining, by the computing device, an event recommendation of the virtual event using the tensile sphere kernel; and
presenting, by the computing device, the event recommendation to the attendee by changing the virtual event user interface to show the event recommendation.

2. The method of claim 1, wherein the event recommendation includes one or more from a group consisting of:
a recommendation to consume content of the virtual event;
a recommendation to utilize a feature of the virtual event;
a recommendation to connect with an attendee of the virtual event; and
a recommendation to navigate along a planned path in the virtual event.

3. The method of claim 1, wherein the actions performed by the attendee within the virtual event include:
consuming content in the virtual event;
utilizing features of the virtual event; and
interacting with other attendees in the virtual event.

4. The method of claim 1, wherein the tensile sphere kernel comprises an encoded representation of the obtained data within a tensile sphere that is specific to the virtual event.

5. The method of claim 4, further comprising creating plural respective tensile sphere kernels that are specific to plural respective attendees of the virtual event, each of the plural respective tensile sphere kernels being within the tensile sphere that is specific to the virtual event.

6. The method of claim 4, wherein the creating the tensile sphere kernel comprises generating respective x,y,z data points within the tensile sphere corresponding to respective ones of the actions performed by the attendee within the virtual event.

7. The method of claim 6, wherein the generating one of the respective x,y,z data points comprises:
extracting features from the obtained data;
generating an x value of the x,y,z data point using a first model that receives the extracted features as input;
generating a y value of the x,y,z data point using a second model that receives the extracted features as input; and
generating a z value of the x,y,z data point using a third model that receives the extracted features as input.

8. The method of claim 1, further comprising determining an affinity between the attendee and another attendee based on a distance between a point in the tensile sphere kernel that is specific to the attendee and a point in a tensile sphere kernel of the other attendee, wherein the determining the event recommendation is based at least in part on the determined affinity.

9. The method of claim 1, further comprising:
generating a replay of the virtual event based on the tensile sphere kernel that is specific to the attendee; and
presenting the replay of the virtual event in the virtual event user interface.

10. The method of claim 9, wherein the replay and the virtual event user interface are configured to permit the attendee to play, rewind, fast forward, and pause the replay.

11. The method of claim 1, further comprising:
receiving input from the attendee defining a subset of the actions performed by the attendee within the virtual event;
generating a replay of virtual event, wherein the replay includes content associated with ones of the actions included in the subset and excludes content associated with ones of the actions not included in the subset; and
presenting the replay of the virtual event in the virtual event user interface.

12. The method of claim 11, wherein the input defining the subset of the actions is received via the virtual event user interface while the attendee is performing one or more of the actions.

13. The method of claim 1, further comprising:
generating a visual representation of the tensile sphere kernel that is specific to the attendee within the tensile sphere of the virtual event; and
presenting the visual representation in the virtual event user interface.

14. The method of claim 13, further comprising:
receiving user input defining a first point in the visual representation and a second point in the visual representation;
determining a path comprising plural intermediate points between the first point and the second point based on minimizing gradient between successive ones of the intermediate points; and
presenting plural content in succession in the virtual event user interface corresponding to the successive ones of the intermediate points and the second point.

15. A computer program product comprising one or more computer readable storage media having program instructions collectively stored on the one or more computer readable storage media, the program instructions executable to:
present a virtual event user interface to an attendee of a virtual event;
obtain data about actions performed by the attendee within the virtual event;
create a tensile sphere kernel that is specific to the attendee using the obtained data;
determine an event recommendation of the virtual event using the tensile sphere kernel; and
present the event recommendation to the attendee by changing the virtual event user interface to show the event recommendation.

16. The computer program product of claim 15, wherein the tensile sphere kernel comprises an encoded representation of the obtained data within a tensile sphere that is specific to the virtual event, the encoded representation being generated by: extracting features of the obtained data;

and generating coordinate values within the tensile sphere using the extracted features with trained models that correspond to different axes within the tensile sphere.

17. The computer program product of claim 15, wherein the event recommendation includes one or more from a group consisting of:
a recommendation to consume content of the virtual event;
a recommendation to utilize a feature of the virtual event;
a recommendation to connect with an attendee of the virtual event; and
a recommendation to navigate along a planned path in the virtual event.

18. The computer program product of claim 15, wherein the actions performed by the attendee within the virtual event include:
consuming content in the virtual event;
utilizing features of the virtual event; and
interacting with other attendees in the virtual event.

19. A system comprising:
a processor, a computer readable memory, one or more computer readable storage media, and program instructions collectively stored on the one or more computer readable storage media, the program instructions executable to:
present a virtual event user interface to an attendee of a virtual event;
obtain data about actions performed by the attendee within the virtual event;
create a tensile sphere kernel that is specific to the attendee using the obtained data;
determine an event recommendation of the virtual event using the tensile sphere kernel; and
present the event recommendation to the attendee by changing the virtual event user interface to show the event recommendation.

20. The system of claim 19, wherein the tensile sphere kernel comprises an encoded representation of the obtained data within a tensile sphere that is specific to the virtual event, the encoded representation being generated by: extracting features of the obtained data; and generating coordinate values within the tensile sphere using the extracted features with trained models that correspond to different axes within the tensile sphere.

* * * * *